United States Patent [19]

Brizzolara et al.

[11] 4,141,875

[45] Feb. 27, 1979

[54] POLYCHLOROPRENE-POLYVINYL ALCOHOL LATEX

[75] Inventors: Donald F. Brizzolara; Wolfgang Honsberg, both of Wilmington, Del.

[73] Assignee: E. I. Du Pont de Nemours and Company, Wilmington, Del.

[21] Appl. No.: 770,057

[22] Filed: Feb. 18, 1977

Related U.S. Application Data

[63] Continuation of Ser. No. 441,940, Feb. 13, 1974, abandoned, which is a continuation-in-part of Ser. No. 365,276, May 30, 1973, abandoned.

[51] Int. Cl.$^2$ ............................................. C08L 11/02
[52] U.S. Cl. ................................ 260/29.7 E; 526/202; 526/224; 526/295; 260/29.7 S; 260/29.7 H
[58] Field of Search ...................... 260/29.7 E, 29.7 H, 260/82.1; 526/202, 224, 295

[56] References Cited

U.S. PATENT DOCUMENTS

| | | | |
|---|---|---|---|
| 2,463,225 | 3/1949 | Vincent | 260/92.7 |
| 2,564,291 | /1951 | Wolf | 260/29.3 X |
| 2,902,458 | /1959 | Teppema | 260/845 X |
| 3,361,693 | /1968 | Geshwind | 260/29.3 |
| 3,492,276 | /1970 | Smith | 260/79 R |
| 3,703,568 | /1972 | Kadowaki et al. | 260/890 |
| 3,912,676 | 10/1975 | Brizzolara et al. | 260/845 X |

FOREIGN PATENT DOCUMENTS 475162 11/1937 United Kingdom.

OTHER PUBLICATIONS

Encyclopedia of Polymer Science and Technology, vol. 3, John Wiley & Sons, Inc., (1965), pp. 705, 708, 711.
Blackley, *High Polymer Latices,* (vol. I), (vol. II), pp. 113–114, 121, 122, 752, and 757 (Applied Science, 1966).

*Primary Examiner*—Paul Lieberman

[57] ABSTRACT

An aqueous latex, having high colloidal stability against coagulation upon addition thereto of ionic materials and having excellent adhesive characteristics for bonding metal foil to paper to form laminates, is prepared by polymerizing, in an emulsion substantially free of carboxylate soaps, (1) an aqueous suspension of chloroprene monomer optionally containing about 0.4 to 10 mole percent of alpha, beta-unsaturated carboxylic acid monomer, based on the total monomer content, (2) in the presence of (a) about 3–10 parts of polyvinyl alcohol and (b) about 0.3–2 parts of an organic, sulfur-containing chain-transfer agent of the group consisting of dialkyl xanthogen disulfides and alkyl mercaptans, both (a) and (b) being expressed in parts by weight based on 100 parts by weight of monomer (1). The polymer so produced contains 10–95% gel polymer, and the polyvinyl alcohol is present therein in a form such that it is not completely recoverable by extraction with water.

4 Claims, No Drawings

POLYCHLOROPRENE-POLYVINYL ALCOHOL LATEX

RELATION TO PRIOR APPLICATION

This is a continuation, of application Ser. No. 441,940, filed Feb. 13, 1974, now abandoned and which is a continuation-in-part of our prior copending application U.S. Ser. No. 365,276 filed May 30, 1973 now abandoned.

BACKGROUND OF THE INVENTION

This invention is in the field of stable latexes of chloroprene homopolymers and copolymers, prepared by polymerization of the corresponding monomers in the presence of polyvinyl alcohols.

In the prior art, difficulty has been encountered in making, by aqueous emulsion polymerization, aqueous latexes of polychloroprene which are stable against coagulation upon the addition of electrolytes and other additives commonly included in latex formulations. Zinc oxide, for instance, is a generally used constituent of compounded latexes. The addition of dry zinc oxide to chloroprene polymer latexes prepared by aqueous, alkaline polymerization of the corresponding monomer results in coagulation of the latex.

Such latex coagulation is not to be confused with the "layering" which occurs upon storage of solvent cements made by processes described in Kadowaki et al. U.S. Pat. No. 3,703,568. According to this patent, if a masticated polychloroprene, a modified phenol resin, and a metal oxide such as zinc or magnesium oxide are mixed to form a homogeneous compound and separately an organic solvent is mixed and reacted with a modified phenol resin and a metal oxide, and these two mixtures are mixed, a homogeneous adhesive composition is obtained. However, if this adhesive is stored for several months, it separates into an upper layer containing the solvent and a lower layer containing the metal oxide.

The Kadowaki et al. process avoids this layering of metal oxide by using in the adhesive a modified rubber obtained by adding a specified amount of polyvinyl alcohol (PVA) in the production step of the chloroprene rubber. The PVA may be added, if desired, to the purified polychloroprene latex — that is, to the latex from which unpolymerized chloroprene monomer has been purged. Thus, in the Kadowaki patent the PVA appears to perform the same function as it does in U.S. Pat. No. 1,629,161 to Hermann et al. — namely, only to provide a protective colloid to maintain the metal oxides in suspension.

Latex adhesives for making paper-metal film laminates, in order to have optimum utility, have heretofore required the incorporation of a protein such as casein into the latex. This entails extra expense for the casein and adds another component to an already complicated composition. There is a need in the art for a paper-metal foil adhesive not requiring casein or other protein as a component.

SUMMARY OF THE INVENTION

Now, according to the present invention, it has been found that the foregoing disadvantages of the prior art can be overcome and that novel compositions and processes are provided by processes comprising polymerizing in an emulsion substantially free of carboxylate soaps (1) an aqueous suspension of chloroprene monomer, (2) in the presence of (a) about 3–10 parts of PVA and (b) about 0.3–2.0 parts of an organic, sulfur-containing chain-transfer agent of the group consisting of dialkyl xanthogen disulfides and alkyl mercaptans, both (a) and (b) being expressed in parts by weight based on 100 parts by weight of monomer (1), whereby a latex is obtained of a polymer which is 10–95% gel polymer and in which PVA is present in a form such that it is not completely recoverable by extraction with water.

DESCRIPTION OF THE PREFERRED EMBODIMENTS

The Polyvinyl Alcohol

The polyvinyl alcohols are commercially available materials. For a discussion of polyvinyl alcohols, see *Encyclopedia of Polymer and Technology,* Interscience Publishers, Vol. 14, page 149 and following, 1971. Any polyvinyl alcohol (hereafter sometimes abbreviated "PVA") can be used which will dissolve in the aqueous polymerization system at the temperature of the polymerization. These are, in general, those polyvinyl alcohols having a mole percent hydrolysis of 80–100% and a degree of polymerization of 350–2500. The preferred PVA, because of its solubility characteristics, has a degree of polymerization of 500–600 and a mole percent hydrolysis of 87–89%.

The amount of polyvinyl alcohol to be used in the polymerization system will, in general, range from about 3 to about 10 parts per 100 parts of monomer, with 4–6 parts being the preferred range. No more than 10 parts is required, and larger amounts result in excessive emulsion viscosities. At least 3 parts are required for adequate emulsion stability during the polymerization.

Colloidal Stabilizers

The polymerizations of this invention are carried out in an aqueous suspension wherein the polyvinyl alcohol is used as the colloidal stabilizer. It is an essential feature that the polymerization system be substantially free of emulsifying agents containing carboxylate groups, such as the soaps of long-chain acids and rosin acids. The system may, however, contain from 0.01–1% by weight, based on monomers, of an acid-stable anionic surface active agent. Typical of these are the surface active agents containing sulfate or sulfonate groups such as the water-soluble salts of naphthalene- or $C_{1-4}$-alkylnaphthalenesulfonic acids or formaldehyde condensates thereof, sulfated fatty alcohols containing 8–18 carbon atoms, alkylbenzene-sulfonic acids containing 8–18 carbon atoms in the alkyl chains, or sulfated condensates of phenol, $C_{1-18}$-alkylphenols, or $C_{8-18}$-fatty alcohols with ethylene oxide. The cations of the salts are usually sodium, potassium, or ammonium ions. It is preferred to use the surfactant when less than 4 parts of polyvinyl alcohol is being used to enhance stability of the emulsion during polymerization and subsequent handling of the latex.

The Copolymerizable Monomers

In a preferred embodiment of the invention the aqueous suspension of chloroprene to be polymerized contains 0.4 to 10 mole percent of an alpha,beta-unsaturated carboxylic acid, based on total monomer content.

The alpha,beta-unsaturated short-chain carboxylic acids which are used as comonomers in preparing the copolymers of this invention may be represented by the following structure

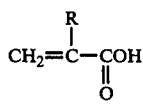

wherein R is hydrogen, an alkyl radical containing 1-4 carbon atoms, or a carboxymethyl radical. Examples of suitable compounds are acrylic acid, methacrylic acid, 2-ethylacrylic acid, 2-propylacrylic acid, 2-butylacrylic acid, and itaconic acid [alpha-(carboxymethyl) acrylic acid]. Of these, the preferred acid is methacrylic acid because of its reactivity and ready availability.

Inclusion of the carboxyl-containing comonomer is advantageous because it contributes to the colloidal stability of the latex. The preferred proportion is 1-5 mole percent, 2-4% being particularly preferred. Levels of unsaturated acid in excess of 10 mole percent, based on total monomers, are undesirable because the resulting latexes have poor shelf stability with respect to viscosity and gelation. A particularly desirable combination of good colloidal stability and adhesive properties is obtained when 5 parts of PVA is used with 100 parts of a monomer mixture containing 2-3 mole percent of the carboxylic comonomer.

A small amount, up to about 10%, of the chloroprene can be replaced with another copolymerizable monomer which does not contain a free carboxylic acid group. Representative comonomers that can be used in the process include vinyl aromatic compounds such as styrene, the vinyl toluenes, and vinylnaphthalenes; aliphatic conjugated diolefin compounds such as 1,3-butadiene, isoprene, 2,3-dimethyl-1,3-butadiene, and 2,3-dichloro-1,3-butadiene; vinyl ethers, esters, and ketones such as methyl vinyl ether, vinyl acetate, and methyl vinyl ketone; esters, amides, and nitriles of acrylic and methacrylic acids such as ethyl acrylate, methyl methacrylate, methacrylamide, and acrylonitrile.

The Chain-Transfer Agent

The presence of a chain-transfer agent is essential in the polymerization system to control the molecular weight and to produce latexes having utility as adhesives. The operable range is about 0.3 to about 2 parts by weight per 100 parts of monomers. The preferred range is 0.5-1.5 parts.

The chain-transfer agents are the conventional organic sulfur-containing chain-transfer agents; the types used are the alkyl mercaptans and the dialkyl xanthogen disulfides. The alkyl mercaptans generally have chain lengths of about from 4-20 carbon atoms. The alkyl radicals may be straight-chained or branched, and the mercaptans may be primary, secondary, or tertiary. It is preferred that the alkyl radicals have about 8-16 carbon atoms. Examples include octyl mercaptan, dodecyl mercaptan, tert-dodecyl mercaptan, tridecyl mercaptan, and mixtures of mercaptans derived from coconut oil (often called lauryl mercaptan or technical dodecyl mercaptan).

The dialkyl xanthogen disulfides can be represented by the structure

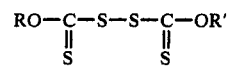

wherein R and R' are alkyl radicals having 1-8 carbon atoms. Examples of suitable alkyl radicals are methyl, ethyl, propyl, isopropyl, and the various isomeric butyl, amyl, hexyl, heptyl, and octyl radicals. The preferred dialkyl xanthogen disulfides are those in which each alkyl radical has 1-4 carbon atoms, especially diisopropyl xanthogen disulfide.

The Polymerization

The polymerization is carried out by forming an aqueous emulsion of the monomers, the chain-transfer agent, the polyvinyl alcohol, and, if used, the acid-stable surface active agent. The concentration of monomer in the emulsion is not critical but will usually range from 40-55%.

The pH of the polymerization emulsion is on the acid side. The preferred pH is 2-4.

Polymerization is initiated and maintained by adding a free-radical polymerization catalyst such as organic or inorganic peroxy compounds with suitable reducing agents. Examples of suitable redox systems are potassium persulfate with potassium sulfite and cumene hydroperoxide with sodium hydrosulfite.

The temperature of polymerization may range from 30°-55° C., preferably between 40° and 50° C.

The polymerization is preferably carried to as high monomer conversion as possible; the preferred conversion is at least 85%, with at least 90% being especially preferred. Polymerization to high conversions produces latexes having especially advantageous properties for use in foil-laminating adhesives.

If desired, polymerization can be stopped by addition of conventional short-stopping agents, such as those disclosed in U.S. Pat. No. 2,576,009. Unreacted monomer can be removed by steam-stripping as disclosed in U.S. Pat. No. 2,467,769. Optionally, the latex can be neutralized or made basic before or after removal of monomer by addition of sodium hydroxide, potassium hydroxide, aqueous ammonia, or organic bases such as diethanolamine and triethanolamine. It is preferred, for optimum storage stability, that the latex contain an excess of alkaline material or a buffering system to react with hydrochloric acid which the polymer slowly loses during storage.

The Latex Produced

The latexes prepared as described above differ from conventional neoprene latexes in several important respects.

The polyvinyl alcohol is not present merely as a conventional emulsifying agent but is at least partially incorporated into the polymer. This is evidenced by the fact that the PVA is not completely recoverable from the polymer by extraction with water. The exact nature of the process has not been established, but the possible reactions involve grafting of chloroprene polymer chains at activated sites on the PVA or esterification or salt formation between the hydroxyl groups of the PVA and, when present, carboxyl groups in the chloroprene copolymers. Probably all of these reactions occur to some extent.

The polymer is not completely soluble in solvents such as benzene, toluene, or tetrahydrofuran. The amount of the solvent-insoluble (gel) component varies depending on a number of factors. The amount of gel will increase as the temperature of polymerization increases and tends to decrease with increasing amount of chain-transfer agent. The gel content will increase as the acid latex ages. The formation of gel after polymerization can be inhibited by neutralizing the latex and providing a buffering system to minimize changes in pH of the latex during storage. In general, the amount of gel will range from 10–95% by weight of the polymer composition. The method of determining the percentage of gel component is described in the Examples.

The percentage of gel in the polymer does not affect the colloidal stability of the latex or the strength of bonds obtained in preparation of foil laminates. However, in some applications where the appearance of the foil laminate is important from an aesthetic point of view, the polymer should contain at least 50 percent by weight of gel. The use of the latex containing the polymer having this high gel content tends to overcome a tendency of the metal foil to form wrinkles which give the metal an appearance somewhat resembling alligator hide.

In the latexes of this invention, the particle size and particle size distribution are quite different from those of conventional chloroprene polymer latexes. The latexes of this invention are characterized by a very narrow particle size distribution centered near a diameter of 0.3 microns. Aggregates of such $0.3\mu$ particles are also present. These are easily dispersed by shear into their component $0.3\mu$ particles. The aggregates range in diameter from about $2\mu$ to about $10\mu$. A small number no more than about 5%, of large single particles are also present. These are in the 0.5 to $1.0\mu$ range. In contrast, in the conventional latexes the average particle size is less than $0.2\mu$ and the size distribution is quite broad.

The latexes of this invention are unique in that they show exceptional stability with respect to addition of or addition to ionic materials. The conventional compounding ingredients such as metal oxides and fillers can be added either dry or as water dispersions free of the usual surfactants without coagulating the latex. Also, the latex can be added without coagulation to such ionic materials as Portland cement under conditions in which conventional latexes will immediately coagulate. This unusual behavior can be explained by the fact that the latexes exhibit a low electrical surface charge as indicated by zeta potential. The zeta potential measured by standard techniques is of the order of $-5$ millivolts as compared with a typical value of $-75$ millivolts for neoprene latex prepared with conventional anionic surfactants. Thus these are essentially nonionic latexes stabilized by steric forces rather than electrical repulsions and are accordingly not coagulated by the kinds of ionic materials which are conventionally used to coagulate anionic or cationic neoprene latex. (For a discussion of zeta potential and its measurement see "Chemistry and Physics of Interfaces," American Chemical Society Publications, copyright 1965, pages 94–99.) Furthermore, the latexes of this invention show exceptional stability against coagulation by mechanical means such as high-shear mixing.

The latexes of this invention can be used for many of the same applications for which conventional neoprene latexes are used. One of their most important applications is as a foil-laminating adhesive, that is, as an adhesive for laminating aluminum foil to a cellulosic substrate. For this use, the latex can be used directly without compounding. However, it is preferred to add an acid acceptor such as zinc oxide or magnesia and a conventional antioxidant. It may also be desirable to add a thickening agent such as an inexpensive clay to facilitate application to the foil. Heretofore, the chloroprene polymer latexes have required the use of a protein material such as casein as an ingredient in the compounding formula. With the latexes of this invention, the additional use of a protein is not necessary.

EXAMPLES

The invention will be better understood by reference to the following illustrative examples in which all parts and percentages are by weight unless otherwise indicated.

PREPARATION OF LATEX

The following general procedure is used. A solution is made of chloroprene, methacrylic acid, and the chain-transfer agent. An aqueous solution is prepared of the water and the PVA. These two solutions are emulsified to form an oil-in-water emulsion.

In the following examples, parts are by weight per 100 parts of total monomer (chloroprene plus methacrylic acid).

The PVA used has a degree of polymerization of 500–600 and mole percent of hydrolysis of 87–89%.

PROCEDURE FOR DETERMINING FOIL-PAPER ADHESION

The compounded latex is applied from a dropper as a bead 2 in. long along the surface of a piece of aluminum foil ⅓ mil thick and approximately 3 × 6 in. in dimension. The latex is spread evenly over the surface of the foil with a gravure roller. A sample of kraft paper (2 mils in thickness) is placed over the treated aluminum surface, and the two pieces are squeezed together with a rubber roller. The laminate is then dried at 121° C. for 10 seconds. The quality of the adhesion is evaluated by peeling the paper from the foil. Adhesion is considered to be good if there is some paper failure, that is, if any paper adheres to the foil when the foil and paper are pulled apart.

PROCEDURE FOR DETERMINING GEL IN THE POLYMER

A film of latex is cast on a surface coated with polytetrafluoroethylene and allowed to dry for at least 24 hours. Two discs 1 in. in diameter are died out of each film and weighed. The thickness of the film is such that the discs weigh between 0.1–0.3 gram. This weight is the original weight [O]. The discs are swollen in tetrahydrofuran in a closed jar for at least 24 hours. The swollen polymer is removed from the solvent, and excess solvent is removed by blotting. The swollen film is then weighed in a closed weighing disk. This gives the swollen weight [S]. The swollen polymer is redried and weighed to give the swollen weight [G]. The percent gel is calculated as follows:

$$\% \text{ gel} = \frac{[G]}{[O]} \times 100$$

EXAMPLE 1

Two samples are prepared using the following recipes:

|  | Parts | |
|---|---|---|
|  | A | B |
| Chloroprene | 98 | 95 |
| Methacrylic acid | 2 | 5 |
| Diisopropyl xanthogen disulfide | 1.2 | 1.2 |
| Water | 100 | 100 |
| PVA | 5 | 5 |

The redox catalyst system is cumene hydroperoxide and sodium hydrosulfite, which are added as required to initiate and maintain polymerization.

The polymerization is carried out to full monomer conversion (about 98%). Temperature of polymerization is 40°–45° C. in the case of A and 40° C. in the case of B.

At the end of the polymerization, an emulsion containing about 0.01 part each of phenothiazine and 4-tert-butylpyrocatechol is added as a stabilizer against any further polymerization.

The latexes are compounded with 5 parts of zinc oxide and 2 parts of an antioxidant [4,4'-thiobis(6-tert-butyl-m-cresol)] per 100 parts of latex solids and are tested as foil-laminating adhesives. They show excellent adhesion with paper failure. (The addition of zinc oxide and an antioxidant is not essential and does not affect the results obtained in the test.)

The following experiments demonstrate the colloidal stability of the latex:

Dry zinc oxide (10 parts per 100 parts of latex solids) is added to the latex without coagulating it.

Dry zinc borate (10 parts per 100 parts of latex solids) is added to the latex without destabilizing it.

Portland cement can be added to the latex or the latex can be added to Portland cement in any proportion without coagulating the latex. Under the same conditions, conventional chloroprene polymer latexes coagulate almost immediately.

In further experiments, Portland cement and sand mixtures are prepared and enough water is added to give a workable mass. Latex is added to this mixture without coagulating the latex. Typical amounts involved are 25 parts of Portland cement, 75 parts of sand, and the following amounts of other materials:

| Latex Solids Parts | Total Water Parts | Percent Latex Solids Based On Cement |
|---|---|---|
| 3.7 | 11–15 | 15 |
| 6.3 | 15–16 | 25 |

The samples of concrete are immersed in 10% aqueous HCl for 24 hours. Weight loss of the samples ranges from 8–16% as compared with 42% in the case of the cement not containing the latex. This shows that the latex can be used advantageously in concrete to improve its stability against attack by acid. While this application is not a new one for chloroprene polymer latexes, the use of these latexes has heretofore been made difficult by the problems of incorporating them into the cement.

EXAMPLE 2

A. Latexes are prepared using three different levels of diisopropyl xanthogen disulfide. The general recipe used is as follows:

|  | Parts |
|---|---|
| Chloroprene | 97 |
| Methacrylic acid | 3 |
| Diisopropyl xanthogen disulfide | Varied |
| Water | 110 |
| Polyvinyl alcohol | 5 |

The amounts of diisopropyl xanthogen disulfide used are as follows:

| A | 1.2 |
|---|---|
| B | 0.8 |
| C | 0.6 |

Polymerization is carried out at 48° C. using the same catalyst system as in Example 1.

The colloidal stability of the latexes and the results in the adhesion tests are similar to those of the latexes in Example 1.

B. Latexes are prepared using the same recipes as in Section A but using different temperatures of polymerization.

The percent of gel in the polymers, determined after the unneutralized latex has aged for one day, are as follows:

| Xanthogen Disulfide Part | Temp. of Polym. ° C. | Gel % |
|---|---|---|
| 0.6 | 45 – 50 | 70 |
| 0.8 | 45 – 50 | 60 |
| 1.2 | 40 – 45 | 10 |

EXAMPLE 3

In this example, the following recipe is used:

|  | Parts |
|---|---|
| Chloroprene | 99.5 |
| Methacrylic acid | 0.5 |
| Diisopropyl xanthogen disulfide | 1.2 |
| Water | 110 |
| PVA | 5 |

Polymerization is carried out at 45° C. using the same catalyst system as in Example 1. Polymerization proceeds satisfactorily to 97% conversion.

The latex has good colloidal stability similar to that of the latexes of Example 1. When the latex is compounded as in Example 1 and is tested as an adhesive for foil laminates, excellent adhesion is obtained with paper failure.

EXAMPLE 4

In this example, the recipe used is as follows:

|  | Parts |
|---|---|
| Chloroprene | 98 |
| Methacrylic acid | 2 |
| Diisopropyl xanthogen disulfide | 1.2 |
| Water | 110 |
| PVA | 3 |
| Acid-stable surfactant (a) | 0.1 |

(a) The acid-stable surfactant is an ammonium salt of a sulfate ester of an alkyl-phenoxypoly(ethyleneoxy)ethanol.

Polymerization is carried out at 45° C. to 95% conversion.

The latex is neutralized to a pH of 6.2 with ammonia and is compounded as follows:

| | |
|---|---|
| Polymer (dry basis) | 100 |
| Zinc oxide (added as a 50% aqueous dispersion) | 5 |
| N-phenyl-2-naphthylamine (added as a 33% aqueous dispersion) | 2 |

The latex shows good colloidal stability during addition of the compounding ingredients.

The compounded latex is tested as a foil adhesive. It shows excellent adhesion with paper failure. Both optical microscopy and disc centrifuge particle size measurement show this latex to be like those prepared with PVA as the only emulsifier-stabilizer. A narrow distribution of particles around $0.36\mu$ was shown by the disc centrifuge. Optical microscopy revealed the usual agglomerates of about $0.3\mu$ particles.

EXAMPLE 5

In this example, dodecyl mercaptan is used as the chain-transfer agent. The recipes used are as follows:

| | A | B | C |
|---|---|---|---|
| Chloroprene | 97 | 97 | 97 |
| Methacrylic acid | 3 | 3 | 3 |
| Dodecyl mercaptan | 0.4 | 0.6 | 0.8 |
| PVA | 5 | 5 | 5 |
| Water | 110 | 110 | 110 |
| Sodium sulfate | 0.2 | 0 | 0 |

Polymerization is carried out at 45° C. using the same catalyst system as in Example 1.

The latexes show good colloidal stability on compounding as described in Example 4. The laminates show excellent adhesion with paper failure.

EXAMPLE 6

In this example, the recipe is as follows:

| | Parts |
|---|---|
| Chloroprene | 97 |
| Methacrylic acid | 3 |
| Diisopropyl xanthogen disulfide | 1.2 |
| Water | 150 |
| PVA | 10 |
| Sodium sulfite | 0.3 |

Polymerization is carried out at 40° C. to essentially full conversion using as catalyst an aqueous solution of potassium persulfate.

The latex is compounded using the following recipe:

| | Parts |
|---|---|
| Polychloroprene | 100 |
| Zinc oxide | 5 |
| N-phenyl-2-naphthylamine (antioxidant) | 2 |

The zinc oxide and antioxidant are added as dry solids to the latex without coagulating the latex. This illustrates the excellent colloidal stability of the latex.

A film of the compounded latex 1 mil thick is spread on the dull side of aluminum foil and kraft paper is pressed against the wet surface. The assembly is dried for 15 minutes at 100° C. The adhesion is tested after 15 minutes. Another sample is tested after heating for 30 minutes at 150° C. In both samples, adhesion is good with paper failure.

EXAMPLE 7

In this example the polymer contains no unsaturated carboxyl-containing comonomer. The recipe used is as follows:

| | Parts by Weight |
|---|---|
| Chloroprene | 97 |
| Diisopropyl xanthogen disulfide | 0.6 |
| Water | 108 |
| Polyvinyl alcohol | 5 |

Polymerization is initiated and maintained by addition of 1.5 ml. of 10% aqueous sodium sulfite followed by addition as needed of 5% potassium persulfate containing 0.125% sodium 2-anthraquinonesulfonate. Polymerization is carried to a 99% conversion at 45° C. for four hours and 50° C. for four hours. The latex is neutralized to pH 7 by the addition of diethanolamine. The polymer contains 70–80% gel. The latex is not coagulated by the addition of acid, base, zinc oxide, or alcohol. The foil laminates prepared from the latex show excellent adhesion with paper failure.

EXAMPLE 8

This experiment does not come within the definition of the invention but illustrates that results obtained by the process of this invention cannot be obtained merely by having PVA present in the polymerization system of a conventional latex, as disclosed particularly in Example 6 of U.S. Pat. No. 3,703,568. The representative latex used in this experiment was that disclosed in U.S. Pat. No. 2,463,225 to Vincent assigned to Du Pont, Example 11. This latex is prepared in the presence of a rosin soap. The modifying agent is iodoform plus a very small amount of sulfur.

The recipe used is as follows:

| | Parts by Weight |
|---|---|
| Chloroprene | 100 |
| Wood rosin (N grade) | 4 |
| Sulfur | 0.01 |
| Iodoform | 0.10 |
| Water | 93 |
| NaOH | 1.1 |
| Polyvinyl alcohol | 1 |

The catalyst is a 5% aqueous solution of potassium persulfate containing 0.25% sodium 2-anthraquinonesulfonate. Polymerization is carried out at 45° C. to essentially complete conversion (about 98%). The latex is stabilized by the addition of one part of diethanolamine in 2.3 ml. of water.

The polymer contains greater than 90% gel.

The latex is easily coagulated by the addition of dry zinc oxide, acids, bases, and other conventional coagulants for conventional latexes.

The particle size distribution of the dispersed particles closely resembles that of the latex prepared in the absence of PVA. That is, the particles have a number average diameter of $0.16\mu$.

Foil laminates prepared from the latex fail cohesively; that is, the rupture of the bond occurs within the layer of adhesive. A portion of the adhesive adheres to each of the substrates as they separate. Similar results are obtained when foil laminates are prepared from the latex which has been prepared with no PVA present during polymerization.

EXAMPLE 9

This example does not come within the definition of the invention but is included to show that results obtained by the process of this invention are not obtained by post-addition of PVA to a conventional polychloroprene latex. The latex used is a high-solids (59%) latex prepared in accordance with the general teachings of U.S. Pat. No. 3,651,037 to Snow assigned to Du Pont. The recipe used is as follows:

|  | Parts by Weight |
|---|---|
| Chloroprene | 100 |
| Dimerized linoleic acid ("Empol" 1022, Emery Industries, Inc.) | 0.15 |
| Disproportionated wood rosin partially neutralized with KOH to an acid No. of 157 ("Resin 731 SK", Hercules, Inc.) | 1.72 |
| Potassium salt of condensate of formaldehyde and alkylnaphthalenesulfonic acid, ("Daxad" 11 KLS, W. R. Grace and Co.) | 0.91 |
| Diethyl xanthogen disulfide | 0.1 |
| 4-tert-butylpyrocatechol (90%) | 0.008 |
| Water | 57.0 |
| KOH | 1.10 |
| Dextrose | 0.10 |
| Potassium sulfite | 0.10 |

Polymerization is carried out to about 90% conversion at 45° C. using an aqueous solution of potassium persulfate as catalyst. Polymerization is stopped by addition of an emulsion containing phenothiazine and 4-tert-butylpyrocatechol. The latex is further stabilized by addition of about 1 part of the potassium soap of a processed wood rosin ("Dresinate" 91, Hercules) and excess monomer is removed.

To two different samples of the latex are added, with stirring, to aqueous solutions of PVA in an amount to give, respectively, 0.1 and 4 parts of PVA per hundred parts of latex solids. The samples are thoroughly stirred. The treated samples are easily coagulated by the addition of dry zinc oxide or other conventional latex coagulants such as acids or bases.

Foil laminates prepared from the latexes behave in the same manner as those of Example 8.

We claim:

1. In a free-radical initiated process for producing an aqueous latex having high colloidal stability against coagulation upon addition thereto of ionic materials and having excellent adhesive characteristics for bonding metal films to paper to form laminates, the step comprising polymerizing at an acidic pH in an emulsion substantially free of carboxylate soaps, (1) an aqueous suspension of chloroprene and an $\alpha,\beta$-unsaturated carboxylic acid having the formula

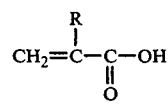

where R is hydrogen, a $C_1$-$C_4$ alkyl, or the carboxymethyl group, the mole ratio of chloroprene to the $\alpha,\beta$-unsaturated carboxylic acid being 99.6-90 to 0.4-10, (2) in the presence of (a) about 3-10 parts of polyvinyl alcohol and (b) about 0.3-2 parts of an organic, sulfur-containing chain transfer agent of the group consisting of dialkyl xanthogen disulfides and alkyl mercaptans, both (a) and (b) being expressed in parts by weight based on 100 parts by weight of the total of monomers (1), whereby latex is obtained of a polymer which is 10-95% gel polymer and from which the polyvinyl alcohol is not completely removable by extraction with water;

with the proviso that an anionic, acid-stable, surface active agent may be present in the polymerization emulsion in an amount of 0.01-1% by weight, based on monomers.

2. A process of claim 1 wherein the polyvinyl alcohol has a mole percent hydrolysis of 80-100 and a degree of polymerization of 350-2500.

3. A process of claim 2 wherein the polymerization system contains from 0.01 to 1.0% based on the total weight of monomers (1) of an anionic, acid-stable, surface active agent.

4. A process of claim 2 wherein the polymerization is continued to at least 85% conversion of the monomers.

* * * * *